(12) United States Patent
Kolb

(10) Patent No.: US 12,251,813 B2
(45) Date of Patent: Mar. 18, 2025

(54) HANDHELD POWER TOOL

(71) Applicant: Andreas Stihl AG & Co. KG, Waiblingen (DE)

(72) Inventor: Joachim Kolb, Ludwigsburg (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 254 days.

(21) Appl. No.: 17/741,608

(22) Filed: May 11, 2022

(65) Prior Publication Data

US 2022/0362919 A1 Nov. 17, 2022

(30) Foreign Application Priority Data

May 12, 2021 (EP) .................................... 21173489

(51) Int. Cl.
*B25F 5/00* (2006.01)
*A01G 20/47* (2018.01)
*H01R 24/76* (2011.01)
*H01R 107/00* (2006.01)

(52) U.S. Cl.
CPC .............. *B25F 5/006* (2013.01); *A01G 20/47* (2018.02); *H01R 24/76* (2013.01); *H01R 2107/00* (2013.01)

(58) Field of Classification Search
CPC . B25F 5/006; B25F 5/02; A01G 20/47; H01R 2107/00
USPC .......................................................... 439/384
See application file for complete search history.

(56) References Cited

U.S. PATENT DOCUMENTS

| | | | | |
|---|---|---|---|---|
| 5,562,477 A * | 10/1996 | Moore | ............... | H01R 13/5219 439/596 |
| 5,687,802 A * | 11/1997 | Spooner | .................... | B25F 5/02 173/169 |
| 5,809,653 A * | 9/1998 | Everts | ....................... | B25F 5/02 30/208 |
| 5,911,592 A * | 6/1999 | Lew | .................... | H01R 12/7005 439/354 |
| 6,026,910 A * | 2/2000 | Masterson | .............. | B25F 5/006 267/141.1 |
| 6,290,587 B1 * | 9/2001 | McCracken | .............. | B25F 5/02 451/357 |
| 6,302,340 B1 * | 10/2001 | Morton | .............. | F02M 51/0671 239/585.4 |
| 6,434,816 B1 * | 8/2002 | Yamamoto | .............. | H01T 13/04 29/407.09 |
| 6,729,414 B2 * | 5/2004 | Cooper | ..................... | B25F 5/02 173/217 |
| 7,243,734 B2 * | 7/2007 | Wu | ..................... | H01M 50/244 173/217 |

(Continued)

FOREIGN PATENT DOCUMENTS

| | | |
|---|---|---|
| CN | 202540266 U | 11/2012 |
| EP | 1 620 233 B1 | 2/2007 |

OTHER PUBLICATIONS

German-language Search Report issued in European Application No. 21173489.2 dated Oct. 27, 2021 with partial English translation (nine (9) pages).

*Primary Examiner* — Alexander Gilman
(74) *Attorney, Agent, or Firm* — Crowell & Moring LLP

(57) ABSTRACT

A handheld power tool has an electric connecting socket and a handle for handling the power tool. The handle includes a plurality of components, wherein at least one component of the handle is used as a mounting of the electric connecting socket.

10 Claims, 1 Drawing Sheet

(56) References Cited

U.S. PATENT DOCUMENTS

| | | | | |
|---|---|---|---|---|
| 7,625,228 | B2* | 12/2009 | Doumani | B25F 5/006 439/384 |
| 7,752,760 | B2* | 7/2010 | Baskar | A01G 3/053 30/340 |
| 7,828,185 | B2* | 11/2010 | Hofmann | B25F 5/006 173/217 |
| 8,496,073 | B2 | 7/2013 | Eisenhardt et al. | |
| 8,966,773 | B2* | 3/2015 | Gregorich | B25F 5/006 30/392 |
| 9,088,107 | B2* | 7/2015 | Kowalczyszyn | H05K 5/0217 |
| 9,941,617 | B2* | 4/2018 | Spitzenberger | H01R 13/04 |
| 10,232,479 | B2* | 3/2019 | Thorson | B25F 5/006 |
| 10,431,925 | B2* | 10/2019 | Yuki | B60K 6/40 |
| 10,527,016 | B2* | 1/2020 | Hagmann | H02G 3/0437 |
| 2003/0182749 | A1* | 10/2003 | Boyer | B24B 41/042 15/97.1 |
| 2003/0228833 | A1* | 12/2003 | Boyer | B24B 23/04 451/344 |
| 2005/0153637 | A1* | 7/2005 | Janson | B24B 23/005 451/359 |
| 2008/0054743 | A1* | 3/2008 | Doumani | H01R 13/6395 310/47 |
| 2015/0196363 | A1* | 7/2015 | Aman | A61B 17/1622 53/425 |
| 2018/0097309 | A1* | 4/2018 | Haspel | H01R 13/65912 |
| 2019/0190206 | A1* | 6/2019 | Kwon | H01R 43/16 |
| 2019/0319394 | A1* | 10/2019 | Trenkamp | H01R 13/514 |
| 2021/0013660 | A1* | 1/2021 | Markefka | H01R 13/42 |
| 2021/0151942 | A1* | 5/2021 | Dobler | H01R 13/6272 |
| 2022/0362919 | A1* | 11/2022 | Kolb | B25F 5/006 |

* cited by examiner

HANDHELD POWER TOOL

CROSS REFERENCE TO RELATED APPLICATION

This application claims priority under 35 U.S.C. § 119 from European Patent Application No. 21173489.2, filed May 12, 2021, the entire disclosure of which is herein expressly incorporated by reference.

BACKGROUND AND SUMMARY

The invention is based on the object of providing a handheld power tool having an electric connecting socket, which can be produced as cost-effectively as possible and exhibits high reliability.

The handheld power tool has an electric connecting socket. The electric connecting socket can be provided to receive a corresponding plug in order, for example, to connect the handheld power tool to an electric energy store or battery or mains power.

The handheld power tool also has a handle for handling the power tool, wherein the handle comprises a plurality of components.

According to the invention, at least one component of the handle is simultaneously used as a mounting of the electric connecting socket, i.e. has a dual use.

In one embodiment, the components of the handle have two handle shells, wherein the handle shells are used as a mounting of the electric connecting socket.

In one embodiment, the handle shells each delimit a semi-circular cylinder, so that, when the latter are joined, they jointly delimit a circular cylinder, into which the electric connecting socket can be inserted.

In one embodiment, the handle shells consist of a thermoplastic elastomer, so that good vibration damping of the electric connecting socket used is ensured.

In one embodiment, the components of the handle have a handle cover, wherein part of the handle cover, for example an end section of the handle cover, is used as a mounting of the electric connecting socket.

In one embodiment, the handle cover is formed as a handle moulding.

In one embodiment, the handle cover consists of a thermoplastic elastomer.

In one embodiment, the at least one component permits a relative movement of the electric connecting socket relative to a housing of the power tool, so that decoupling of the vibration of the electric connecting socket relative to the housing is made possible.

In one embodiment, the at least one component has vibration-damping properties.

In one embodiment, the electric connecting socket has a number of electric connecting contacts, in particular exactly four electric connecting contacts.

In one embodiment, the electric connecting socket has a circularly cylindrical shape.

In one embodiment, the power tool is a chainsaw or a hedge trimmer or a leaf blower or a leaf vacuum or a lawn mower or a brush-cutter.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
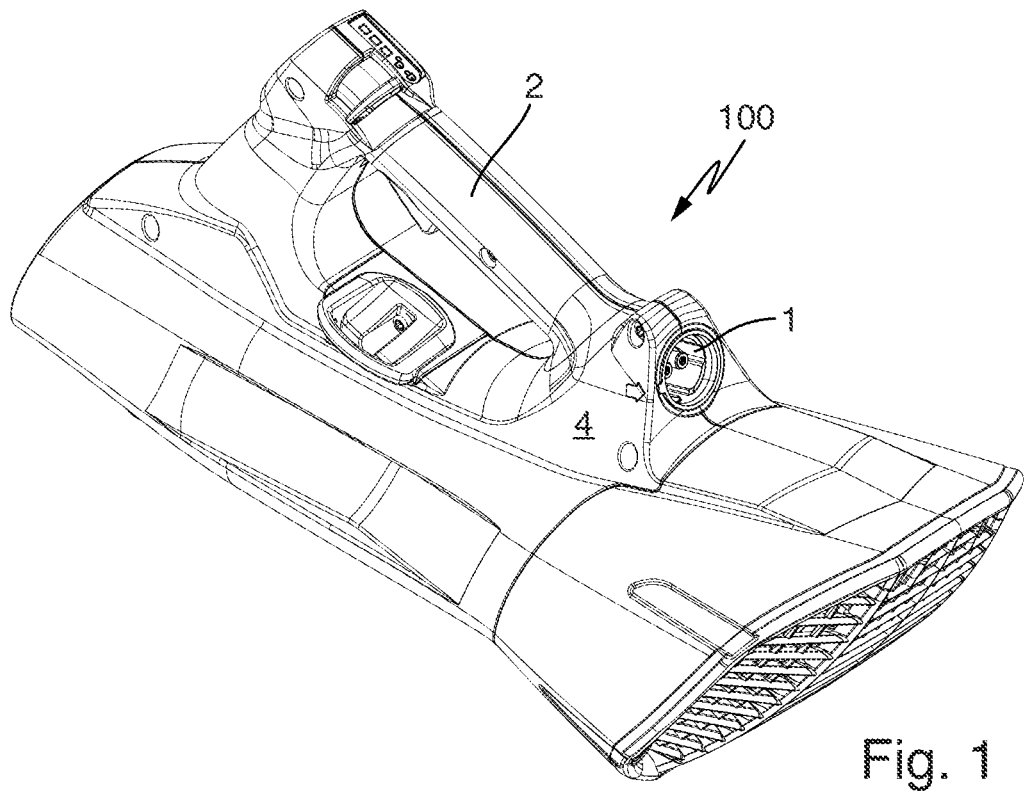
FIG. 1 shows a perspective view of a handheld power tool according to an embodiment of the invention in the form of a leaf blower.

FIG. 1 shows a perspective view of a handheld power tool in the form of a leaf blower.

Figure 2:
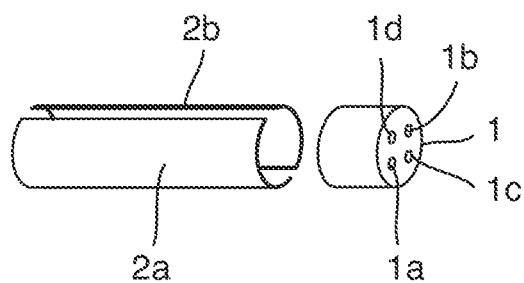
FIG. 2 shows, highly schematically, an exemplary view of components of a handle of the handheld power tool and an electric connecting socket of the handheld power tool.
Figure 2:
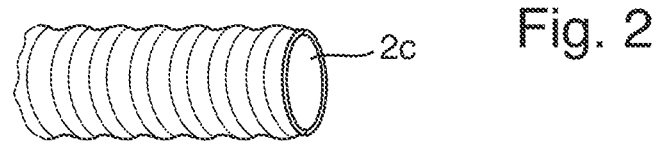

FIG. 2 shows, highly schematically, an exemplary view of components 2a, 2b and 2c of a handle 2 of the handheld power tool 100, and an exemplary view of an electric connecting socket 1 of the handheld power tool. The components shown in FIG. 2 can differ from their illustration in FIG. 1, in particular because of their merely exemplary illustration.

Referring to FIG. 1 and FIG. 2, the handheld power tool 100 has a conventional electric connecting socket 1 with four electric connecting contacts 1a, 1b, 1c, 1d. The connecting socket 1 with its connecting contacts 1a, 1b, 1c, 1d corresponds, for example, to a plug of a backpack battery which is used to supply the handheld power tool 100 or to supply the electronics and an electric motor of the handheld power tool 100. The electric connecting socket 1 has a circularly cylindrical shape.

The handheld power tool 100 also has a handle 2 for handling the power tool 100, wherein the handle comprises a plurality of components 2a, 2b, 2c.

The components of the handle have two handle shells 2a, 2b, wherein the handle shells 2a, 2b each delimit a semi-circular cylinder. The handle shells 2a, 2b each consist of a thermoplastic elastomer.

The components of the handle also have a handle cover 2c, wherein the handle cover 2c is formed as a handle moulding. The handle cover 2c consists of a thermoplastic elastomer. The handle cover 2c can enclose the two handle shells 2a, 2b in an operational state.

According to the invention, the handle shells 2a, 2b and/or the handle cover 2c are used as a mounting or mounting component of the electric connecting socket 1.

For example, it is possible that the two handle shells 2a, 2b form the mounting of the electric connecting socket 1 by the connecting socket 1 being pushed into the circularly cylindrical cavity formed by the two handle shells 2a, 2b.

The components 2a, 2b, 2c each have vibration-damping properties and permit a relative movement of the electric connecting socket 1 relative to a housing 4 of the power tool 100.

According to the invention, the socket is mounted in such a way that vibrations and movements are damped/attenuated.

For this purpose, the handle shells 2a, 2b are designed (from TPE or another soft rubber) in such a way that the electric connecting socket 1 is mounted in the handle shells 2a, 2b. In other words, the handle shells 2a, 2b are used as a socket mount including a damper and therefore have a dual use.

Alternatively or additionally, the handle cover 2c and the moulding of the handle point (normally made of TPE or another soft rubber) can be guided inwards into an inner side of the handle housing in such a way that the electric connecting socket 1 is mounted in the handle cover 2c. In other words, the handle cover 2c or the moulding of the handle point, which, for example, is formed by the handle shells 2a and 2b, is used as a socket mount including a damper and therefore has a dual use.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A handheld power tool, comprising:
   an electric connecting socket; and
   a handle for handling the power tool, wherein
   the handle comprises a plurality of components, and
   at least one component of the handle is used as a mounting of the electric connecting socket,
   wherein the components of the handle comprise a handle cover formed as a handle moulding, wherein part of the handle cover forms the mounting of the electric connecting socket,
   wherein the components of the handle further comprise two handle shells enclosed by part of the handle cover, and
   wherein the two handle shells are additionally used as a mounting of the electric connecting socket.

2. The handheld power tool according to claim 1, wherein the two handle shells each delimit a semi-circular cylinder.

3. The handheld power tool according to claim 1, wherein the handle shells are made of a thermoplastic elastomer.

4. The handheld power tool according to claim 1, wherein the handle cover is made of a thermoplastic elastomer.

5. The handheld power tool according to claim 1, wherein the at least one component permits a relative movement of the electric connecting socket relative to a housing of the power tool.

6. The handheld power tool according to claim 1, wherein the at least one component has vibration-damping properties.

7. The handheld power tool according to claim 1, wherein the electric connecting socket has a number of electric connecting contacts.

8. The handheld power tool according to claim 7, wherein the number is exactly four electrical connecting contacts.

9. The handheld power tool according to claim 1, wherein the electric connecting socket has a circularly cylindrical shape.

10. The handheld power tool according to claim 1, wherein
   the power tool is a chainsaw, a hedge trimmer, a leaf blower, a leaf vacuum, a lawn mower, or a brush-cutter.

* * * * *